(12) United States Patent
Tan et al.

(10) Patent No.: US 10,570,247 B2
(45) Date of Patent: Feb. 25, 2020

(54) THERMOPLASTIC EPOXY MATRIX FORMULATION, PREPREG, COMPOSITE AND METHOD FOR MANUFACTURING THE SAME

(71) Applicant: SWANCOR INDUSTRIAL CO., LTD., Nan-Tou (TW)

(72) Inventors: Kok-Sheng Tan, Nan-Tou (TW); Chen-Han Chien, Nan-Tou (TW); Yu-Tsan Tseng, Nan-Tou (TW)

(73) Assignee: SWANCOR INDUSTRIAL CO., LTD., Nan-Tou (TW)

( * ) Notice: Subject to any disclaimer, the term of this patent is extended or adjusted under 35 U.S.C. 154(b) by 428 days.

(21) Appl. No.: 15/012,868

(22) Filed: Feb. 2, 2016

(65) Prior Publication Data

US 2017/0218113 A1    Aug. 3, 2017

(51) Int. Cl.
| | |
|---|---|
| *C08G 59/22* | (2006.01) |
| *C08G 59/50* | (2006.01) |
| *C08G 59/62* | (2006.01) |
| *C08G 59/02* | (2006.01) |
| *C08G 59/68* | (2006.01) |
| *C08J 5/24* | (2006.01) |

(52) U.S. Cl.
CPC ......... *C08G 59/5033* (2013.01); *C08G 59/02* (2013.01); *C08G 59/50* (2013.01); *C08G 59/621* (2013.01); *C08G 59/68* (2013.01); *C08J 5/24* (2013.01); *C08J 2363/00* (2013.01); *C08J 2363/02* (2013.01)

(58) Field of Classification Search
CPC .... C08G 59/5033; C08G 59/02; C08G 59/68; C08J 5/24
USPC .......................................................... 442/59
See application file for complete search history.

(56) References Cited

U.S. PATENT DOCUMENTS

| | | | | |
|---|---|---|---|---|
| 3,373,140 | A |   | 3/1968 | Aftergut |
| 3,790,522 | A | * | 2/1974 | Bliss ...................... C08G 59/50 |
| | | | | 523/440 |
| 4,162,998 | A |   | 7/1979 | Doi et al. |
| 4,308,085 | A |   | 12/1981 | Horhold et al. |
| 5,279,870 | A | * | 1/1994 | Kester ................... C08G 59/20 |
| | | | | 204/155 |
| 2003/0082385 | A1 | * | 5/2003 | Li ..................... C08G 59/4021 |
| | | | | 428/417 |

FOREIGN PATENT DOCUMENTS

| | | |
|---|---|---|
| TW | 200600535 | 1/2006 |
| TW | 200718750 | 5/2007 |

* cited by examiner

*Primary Examiner* — Vincent Tatesure
(74) *Attorney, Agent, or Firm* — CKC & Partners Co., LLC

(57) ABSTRACT

A thermoplastic epoxy matrix formulation, based on 100 parts by weight of the thermoplastic epoxy matrix formulation, includes 0.1 to 95 parts by weight of a difunctional epoxy resin and 0.1 to 80 parts by weight of a latent hardener, wherein the latent hardener is an amine compound containing two reactive hydrogens.

18 Claims, 7 Drawing Sheets

THERMOPLASTIC EPOXY MATRIX FORMULATION, PREPREG, COMPOSITE AND METHOD FOR MANUFACTURING THE SAME

BACKGROUND

Technical Field

The present disclosure relates to an epoxy matrix formulation, an epoxy matrix prepreg, an epoxy matrix composite and a method for manufacturing the thermoplastic epoxy matrix prepreg. More particularly, the present disclosure relates to a thermoplastic epoxy matrix formulation, a thermoplastic epoxy matrix prepreg, a thermoplastic epoxy matrix composite and a method for manufacturing the thermoplastic epoxy matrix prepreg.

Description of Related Art

With the vigorous development of science and technology, composite materials have become the mainstream of modern industry. The composite materials refer to a multi-phase solid material composed of at least two substances having different physical and chemical properties. The composite materials generally include a continuous phase and a dispersed phase, wherein the continuous phase is called base material, and the dispersed phase is called reinforcing material. The composite materials are featured with high strength, low density, high acid and alkali resistance and high environmental durability by drawing upon and benefiting from the substances composed thereof or the synergistic effects provided by the substances composed thereof. Accordingly, the composite materials are regarded as a promising material and are gradually replacing conventional metal materials and ceramic materials. The composite materials are widely applied to a variety of fields, such as the field of aerospace industry, transport, sports equipment, building equipment and national defense.

When the base material of the composite materials is made of polymer matrix, the composite materials are called polymer matrix composites. Epoxy resins are widely used to prepare the base material (epoxy matrix), and the polymer matrix composite having the epoxy matrix is called epoxy matrix composite. However, the conventional epoxy matrix made of the epoxy resins is thermoset, which cannot be reshaped after cured. Accordingly, the conventional epoxy matrix composite is thermoset and cannot be recycled after cured, which is not favorable for the subsequent processes and maintenance, and is not environment friendly.

A thermoplastic epoxy matrix composite is provided for addressing the shortcomings of the conventional thermoset epoxy matrix composite. The thermoplastic epoxy matrix of the thermoplastic epoxy matrix composite is polymerized by a difunctional epoxy resin and a difunctional amine hardener, and is inherited most of the advantages of the thermoset epoxy matrix, such as high strength, high rigidity and excellent combining property which is favorable to combine with other material. Furthermore, the thermoplastic epoxy matrix composite is thermoplastic and can be reshaped after fully cured.

However, the potential problem for the thermoplastic epoxy matrix composite is the preparation of a prepreg thereof. The common method for preparing the prepreg includes a melt impregnation process (also known as hot-melt method) and a solution impregnation process. The melt impregnation process includes a mixing stage and an impregnating stage. Specifically, in the mixing stage, the epoxy resin with epoxide groups and a hardener are mixed to form a resin mixture. In the impregnating stage, the resin mixture is contacted with a reinforcing material (such as fibers) for a time, then a resin film combined with the fibers is formed so as to obtain the prepreg. The solution impregnation process is conducted as follows. First, the epoxy resin and the hardener are completely dissolved in a solvent to form a resin solution, then the reinforcing material is contacted with the resin solution for impregnating. Afterwards, the solvent is evaporated so as to obtain the prepreg. Comparing the melt impregnation process to the solution impregnation process, the solvent is not necessary in the melt impregnation process, so that the environmental pollution and the cost can be reduced. Furthermore, the quality of the prepreg and the production efficiency can be enhanced. Accordingly, the melt impregnation process is favored by the relevant industries. However, the temperature required by a thermoplastic epoxy matrix in the mixing stage is about 200° C. to 400° C., which is much higher than that of a thermoset epoxy matrix (the temperature required by the thermoset epoxy matrix in the mixing stage is about 50° C. to 80° C.). Accordingly, the melt impregnation process of the thermoplastic epoxy matrix is energy-consuming. Furthermore, when the epoxy matrix is thermoplastic, the viscosity of the resin mixture increases sharply in the mixing stage due to the heating temperature. As a result, the uniformity of the thickness of the resin film is affected, i.e., the resin content (RC) cannot be precisely controlled. Even more, the excessive viscosity tends to cause the resin mixture to adhere tightly to the inner wall of the resin bath, and the resin bath is difficult to be cleaned.

Therefore, how to improve the formulation of the thermoplastic epoxy matrix, which can reduce the temperature and prevent an excessive viscosity of the resin mixture when preparing the prepreg, and the prepreg can be cured at a higher temperature (about 160° C. to 180° C.) to form the thermoplastic epoxy matrix composite, is the goal of the related industries.

SUMMARY

According to one aspect of the present disclosure, a thermoplastic epoxy matrix formulation, based on 100 parts by weight of the thermoplastic epoxy matrix formulation, includes 0.1 to 95 parts by weight of a difunctional epoxy resin and 0.1 to 80 parts by weight of a latent hardener, wherein the latent hardener is an amine compound containing two reactive hydrogens.

According to another aspect of the present disclosure, a thermoplastic epoxy matrix prepreg includes a plurality of fibers and a resin film. The resin film is combined with the fibers, and the resin film is prepared by the aforementioned thermoplastic epoxy matrix formulation.

According to further another aspect of the present disclosure, a thermoplastic epoxy matrix composite includes a plurality of fibers and a thermoplastic epoxy matrix. The thermoplastic epoxy matrix is combined with the fibers, and the thermoplastic epoxy matrix is prepared from the aforementioned thermoplastic epoxy matrix formulation by undergoing a polymerization reaction.

According to yet another aspect of the present disclosure, a method for manufacturing a thermoplastic epoxy matrix prepreg includes steps as follows. A plurality of fibers are provided. A combining step is provided, wherein a resin film is combined with the fibers. The resin film is prepared by a thermoplastic epoxy matrix formulation. The thermoplastic epoxy matrix formulation includes 0.1 to 95 parts by weight of a difunctional epoxy resin and 0.1 to 80 parts by weight of a latent hardener based on 100 parts by weight of the thermoplastic epoxy matrix formulation, and the latent hardener is an amine compound containing two reactive hydrogens.

BRIEF DESCRIPTION OF THE DRAWINGS

The present disclosure can be more fully understood by reading the following detailed description of the embodiment, with reference made to the accompanying drawings as follows.

DETAILED DESCRIPTION

Thermoplastic Epoxy Matrix Formulation

Figure 1:
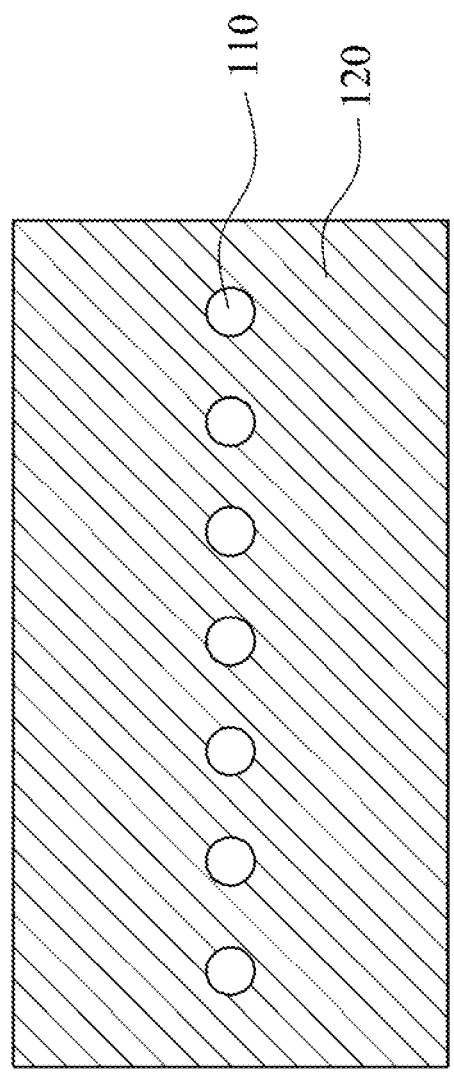
FIG. 1 is a schematic cross-sectional view illustrating a thermoplastic epoxy matrix prepreg according to one embodiment of the present disclosure.

A thermoplastic epoxy matrix formulation, based on 100 parts by weight of the thermoplastic epoxy matrix formulation, includes 0.1 to 95 parts by weight of a difunctional epoxy resin and 0.1 to 80 parts by weight of a latent hardener, wherein the latent hardener is an amine compound containing two reactive hydrogens.

The thermoplastic epoxy matrix formulation can selectively include a catalyst and/or an additive.

When the latent hardener is the amine compound containing two reactive hydrogens, the latent hardener and the difunctional epoxy resin can undergo a polymerization reaction so as to form a linear epoxy polymer. Accordingly, the product (also called "thermoplastic epoxy matrix" hereinafter) of the polymerization reaction of the difunctional epoxy resin and the latent hardener is thermoplastic. The thermoplastic epoxy matrix can be reshaped after cured, which is favorable for recycling, subsequent processes and maintenance, and is environment friendly.

Furthermore, the formulation of the thermoplastic epoxy matrix can prevent the viscosity of the resin mixture of the formulation from increasing sharply at a heating temperature for preparing a thermoplastic epoxy matrix prepreg. Accordingly, it is favorable to maintain a thickness of a resin film when preparing the thermoplastic epoxy matrix prepreg, and the RC can be precisely controlled. Moreover, without the excessive viscosity, the resin mixture will not adhere tightly to the inner wall of the resin bath, and the resin bath is easy to be cleaned.

Hereinafter, the difunctional epoxy resin, the latent hardener, the catalyst and the additive will be described in more details.

<Difunctional Epoxy Resin>

The difunctional epoxy resin is a diepoxide. Specifically, the "diepoxide" refers to a compound having two epoxide groups. Accordingly, the difunctional epoxy resin can undergo a polymerization reaction. Furthermore, the difunctional epoxy resin can be a pure difunctional epoxy resin or a blended difunctional epoxy resin. The pure difunctional epoxy resin includes only one kind of diepoxide. The blended difunctional epoxy resin includes at least two kinds of diepoxide.

The difunctional epoxy resin can be but is not limited to a bisphenol A (BPA) epoxy resin, a bisphenol F (BPF) epoxy resin or a tetrabromobisphenol A (TBBPA) epoxy resin.

An epoxy equivalent weight (E.E.W.) of the difunctional epoxy resin can be 150 g/mol to 1000 g/mol, so that it is suitable for forming the resin mixture of formulation at 20~80° C. Otherwise, it may be difficult to mix with hardener while the E.E.W. of the difunctional epoxy resin is too high.

<Latent Hardener>

The latent hardener is an amine compound containing two reactive hydrogens.

The "latent hardener" refers to a hardener which shows only low or limited reactivity at the heating temperature for preparing the thermoplastic epoxy matrix prepreg, but which reacts with the difunctional epoxy resin at an elevated temperature, such as 160° C. to 180° C.

The "amine compound" refers to a compound includes at least one amine group.

The "reactive hydrogen" refers to a hydrogen atom connecting with a nitrogen atom of the amine group. The reactive hydrogen can react with the epoxide group of the difunctional epoxy resin.

The "amine compound containing two reactive hydrogens" refers to the amine compound containing only two reactive hydrogens. In other words, an amine compound containing three reactive hydrogens or more is excluded by the thermoplastic epoxy matrix formulation of the present disclosure.

The latent hardener can be selected from the group of Formula (I), Formula (II), Formula (III) and Formula (IV):

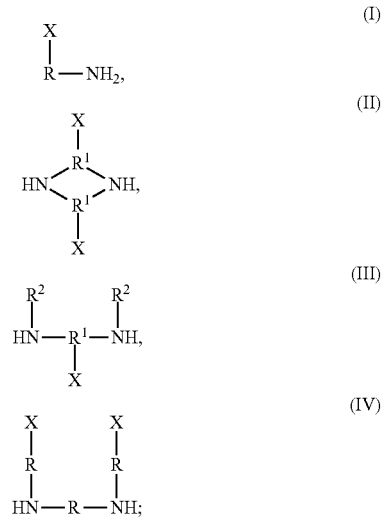

wherein R is independently a divalent hydrocarbon group having 1 to 20 carbon atoms, $R^1$ is independently a trivalent hydrocarbon group having 1 to 20 carbon atoms, $R^2$ is independently a monovalent hydrocarbon group having 1 to 20 carbon atoms, and X is an electron-withdrawing group or a steric hindrance group and is nonreactive to the difunctional epoxy resin.

The term "nonreactive" refers that X cannot cause a self-polymerization reaction of the difunctional epoxy resin, and X cannot react with the epoxide group of the difunctional epoxy resin.

Specifically, R can be a divalent aliphatic group having 1 to 20 carbon atoms, such as a divalent alkyl group and a divalent alkenyl group. R also can be a divalent aryl group having 1 to 20 carbon atoms, such as a divalent phenyl group. $R^1$ can be a trivalent aliphatic group having 1 to 20 carbon atoms, such as a trivalent alkyl group and a trivalent alkenyl group. $R^1$ also can be a trivalent aryl group having 1 to 20 carbon atoms, such as a trivalent phenyl group. $R^2$ can be independently a monovalent aliphatic group having 1 to 20 carbon atoms, such as a monovalent alkyl group and a monovalent alkenyl group. $R^2$ also can be a monovalent aryl group having 1 to 20 carbon atoms, such as a monovalent phenyl group.

The electron-withdrawing group can be selected from the group of $—NO_2$, $—OCH_3$, $—F$, $—Cl$, $—Br$, $—I$, a phenyl group, an ester group, an aldehyde group and a ketone group. The electron-withdrawing group cannot be $—CN$ and $—SO_3$, or the product of the polymerization reaction of the difunctional epoxy resin and the latent hardener will be thermoset.

The steric hindrance group is a monovalent hydrocarbon group having 1 to 20 carbon atoms. Specifically, the steric hindrance group can be a monovalent aliphatic group having 1 to 20 carbon atoms, such as a monovalent alkyl group and a monovalent alkenyl group. The steric hindrance group also can be a monovalent aryl group having 1 to 20 carbon atoms. More specifically, the steric hindrance group can be a methyl group, an ethyl group or an isobutyl. The reactivity of the amine group can be reduced by the steric hindrance group.

<Catalyst>

The thermoplastic epoxy matrix formulation can further include a catalyst for accelerating the polymerization reaction of the difunctional epoxy resin and the latent hardener. Furthermore, the catalyst causes no self-polymerization of the difunctional epoxy resin.

The catalyst can include a phenol group-containing compound or a Lewis acid. The phenol group-containing compound can be but is not limited to a phenol, a diphenol and a bisphenol. The Lewis acid can be but is not limited to tributyl phosphate, triphenyl phosphate, triethyl ammonium biscarbonate or tetrabutylammonium bromide.

The thermoplastic epoxy matrix formulation can include 0.01 to 5 parts by weight of the catalyst, so that the amount of the catalyst is proper. Accordingly, the residue of the catalyst is not excessive, and the brittleness and the glass transition temperature (Tg) of the thermoplastic epoxy matrix can be reduced.

<Additive>

The thermoplastic epoxy matrix formulation can further include an additive for improving the properties of the product of the polymerization reaction of the difunctional epoxy resin and the latent hardener.

Specifically, the additive can include a crosslinking agent, a UV-blocking agent, a plasticizer, a flexibilizer, an internal mold releasing agent or a filler. The aforementioned additive can be used separately or simultaneously.

Specifically, the crosslinking agent can be but is not limited to commercial available diamine, such as polyetheramine, triethylenetetramine, m-xylenediamine, isophorone diamine and aminoethylpiperazine. Preferably, the amount of the crosslinking agent is not greater than 3 parts by weight, which is favorable to maintain the thermoplastic property of the product of the polymerization reaction of the difunctional epoxy resin and the latent hardener.

The UV-blocking agent can be but is not limited to 2-(2H-benzotriazol-2-yl)-p-cresol, 2,4-dihydroxybenzophenone, 2',4'-di-tert-butylphenyl 3,5-di-tert-butyl-4-hydroxybenzoate, 2-(2H-benzotriazol-2-yl)-4,6-bis(1-methyl-1-phenylethyl)phenol, 2,2',4,4'-Tetrahydroxybenzophenone, 2,4-di-tert-butyl-6-(5-chloro-2H-benzotriazol-2-yl)phenol or 2-hydroxy-4-(octyloxy)benzophenone.

The plasticizer can be but is not limited to bis(2-ethylhexyl) phthalate, propylene glycol, bis(2-propylheptyl) phthalate, diisononyl phthalate, butyl benzyl phthalate, diisodecyl phthalate, diisobutyl phthalate or di-n-hexyl phthalate.

The flexibilizer can be but is not limited to silica rubber or co-block-polymers. The co-block-polymers can be but are not limited to butadiene-acrylonitrile copolymers or butadiene-acrylonitrile copolymer.

The filler can be but is not limited to flame retardant, precipitated silica, fumed silica, aluminum hydroxide or titanium dioxide.

The thermoplastic epoxy matrix formulation can include 0.01 to 20 parts by weight of the additive, so that the thermoplastic epoxy could maintain its physical properties. Overdose of additive may lead to incomplete polymerization.

Thermoplastic Epoxy Matrix Prepreg

FIG. 1 is a schematic cross-sectional view illustrating a thermoplastic epoxy matrix prepreg 100 according to one embodiment of the present disclosure. In FIG. 1, the thermoplastic epoxy matrix prepreg 100 includes a plurality of fibers 110 and a resin film 120 combined with the fibers 110. Specifically, the fibers 110 can be embedded in the resin film 120. The resin film 120 is prepared by the aforementioned thermoplastic epoxy matrix formulation.

Figure 2:
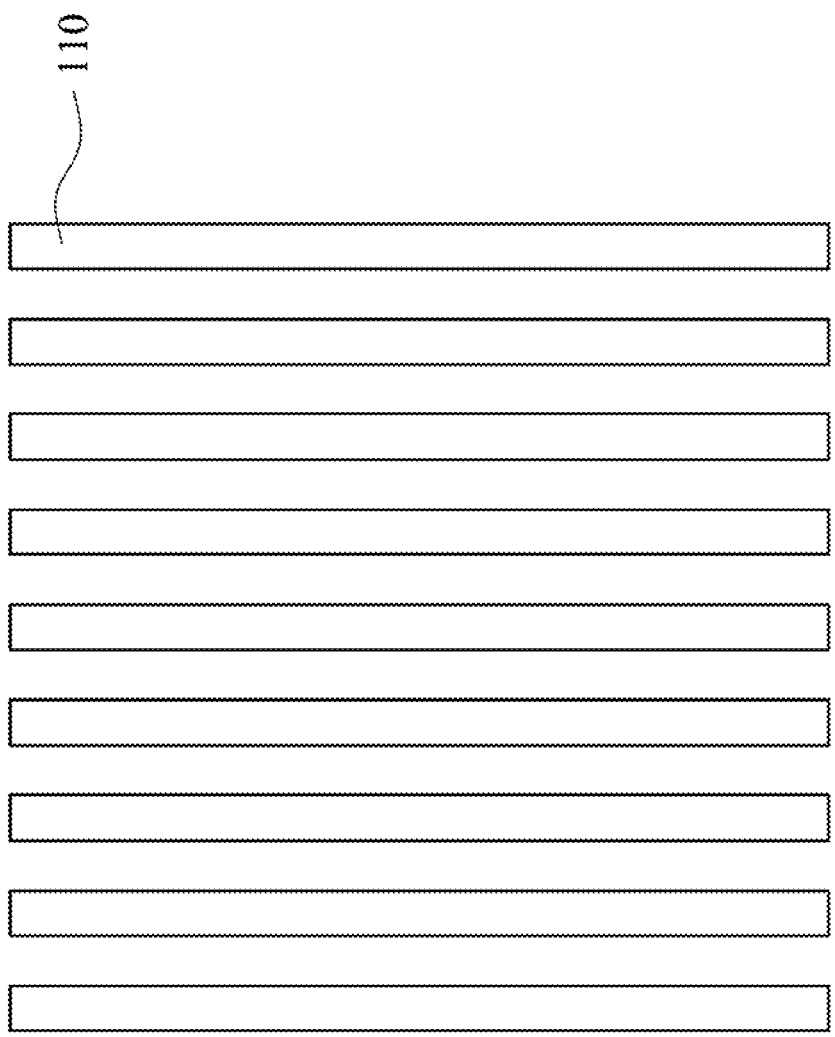
FIG. 2 is a schematic plan view showing fibers in FIG. 1.
Figure 3:
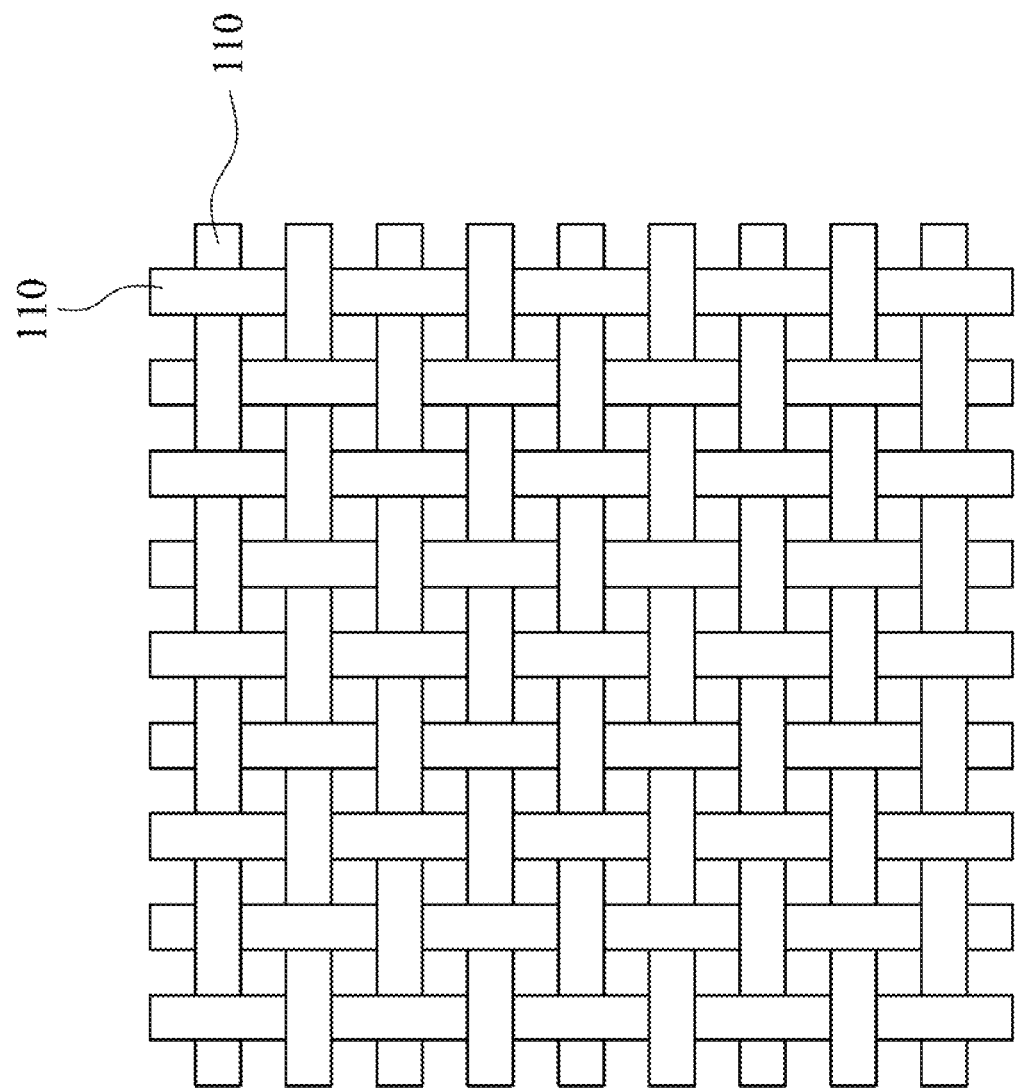
FIG. 3 is a schematic plan view showing fibers according to another embodiment of the present disclosure.

FIG. 2 is a schematic plan view showing the fibers 110 in FIG. 1. Specifically, the fibers 110 can include metal fibers, glass fibers, ceramic fibers, carbon fibers, graphite fibers, Kevlar fibers or a mixture thereof. In FIG. 2, the fibers 110 are continuous and aligned, and the fibers 110 are independent with each other. Please further refer to FIG. 3, which is a schematic plan view showing the fibers 110 according to another embodiment of the present disclosure. In FIG. 3, the fibers 110 are formed into a fabric. Specifically, the fibers 110 can be woven to form a woven fabric, or can be knit to form a knit fabric. When the fibers 110 are continuous and aligned or when the fibers 110 are formed into a fabric, the strength of the thermoplastic epoxy matrix composite can be enhanced. However, it is more difficult to completely impregnate the fibers 110 with the resin mixture, i.e., the difficulty to manufacture the thermoplastic epoxy matrix prepreg 100 is enhanced, and the yield rate of the thermoplastic epoxy matrix prepreg 100 is reduced. Via the thermoplastic epoxy matrix formulation according to the present disclosure, an excessive viscosity of the resin mixture can be prevented, which is favorable to completely impregnate the fibers 110 with the resin mixture. Accordingly, the yield rate of the thermoplastic epoxy matrix prepreg 100 can be enhanced. In other embodiment, the fibers 110 can be discontinuous or randomly oriented. Also, the fibers 110 can be entwined with each other to form a yarn. The fibers 110 can be used in a composite is well known in the related art, and the other details thereof will not be repeated herein.

<Method for Manufacturing the Thermoplastic Epoxy Matrix Prepreg>

Figure 5:
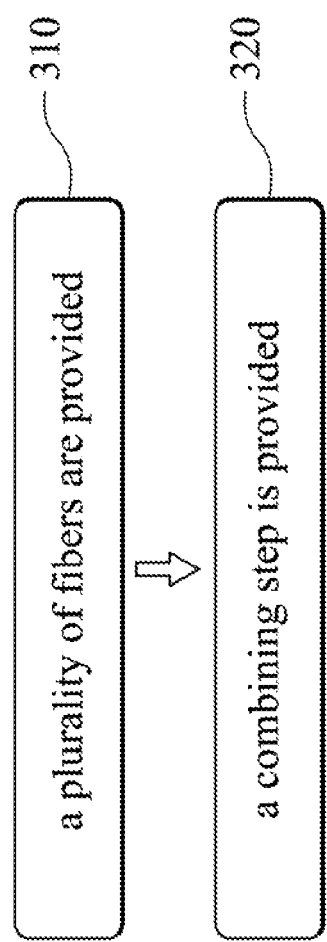
FIG. 5 is a flow diagram showing a method for manufacturing a thermoplastic epoxy matrix prepreg according to yet another embodiment of the present disclosure.

FIG. 5 is a flow diagram showing a method for manufacturing a thermoplastic epoxy matrix prepreg according to yet another embodiment of the present disclosure. The structure of thermoplastic epoxy matrix prepreg can refer to FIG. 1. In FIG. 5, the method for manufacturing the thermoplastic epoxy matrix prepreg includes Step 310 and Step 320.

In Step 310, a plurality of fibers are provided. The details of the fibers can refer to the foregoing, and will not be repeated herein.

In Step 320, a combining step is provided, wherein a resin film is combined with the fibers. The resin film is prepared by the aforementioned thermoplastic epoxy matrix formulation.

Figure 6:
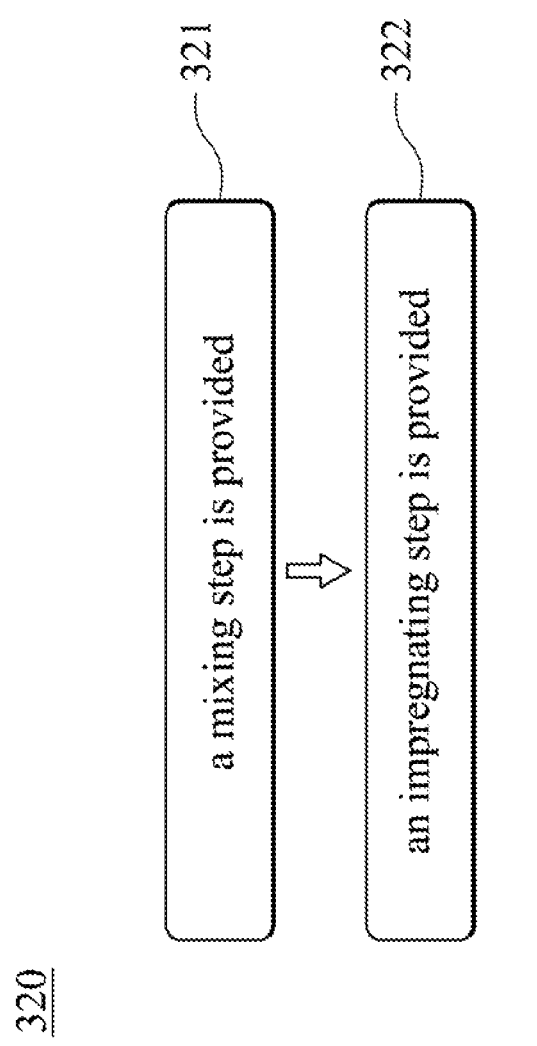
FIG. 6 is a flow diagram showing Step 320 of the method for manufacturing the thermoplastic epoxy matrix prepreg in FIG. 5.

The resin film can be combined with the fibers by hot-melt method. Please refer to FIG. 6, which is a flow diagram showing Step 320 of the method for manufacturing a thermoplastic epoxy matrix prepreg in FIG. 5. Step 320 includes Step 321 and Step 322. In Step 321, a mixing step is provided, wherein the difunctional epoxy resin and the latent hardener are mixed to form a resin mixture. The mixing step can be conducted at 20° C. to 80° C. In Step 322, an impregnating step is provided, wherein the resin mixture is contacted with fibers, and the resin film combined with the fibers is formed. The impregnating step can be conducted at 90° C. to 120° C., so that the resin film can be well combined with the fibers, and the voids in the combination of the resin film and the fibers could be removed in this process as well. With the application of the thermoplastic epoxy matrix formulation, the temperature required by the mixing step is significantly reduced, which can save energy. Furthermore, with the application of the thermoplastic epoxy matrix formulation, the viscosity of the resin mixture is not enhanced significantly by the heating temperature, which is favorable to enhance the uniformity of the thickness of the resin film, and the RC can be precisely controlled. Moreover, without an excessive viscosity, the resin mixture will not adhere tightly to the inner wall of the resin bath, and the resin bath is easy to be cleaned. Furthermore, with the uniformity of the thickness of the resin film, the thermoplastic epoxy matrix prepreg can be folded or stacked tightly. The hot-melt method is well known in the related art and the other details will not be repeated herein.

Thermoplastic Epoxy Matrix Composite

Figure 4:
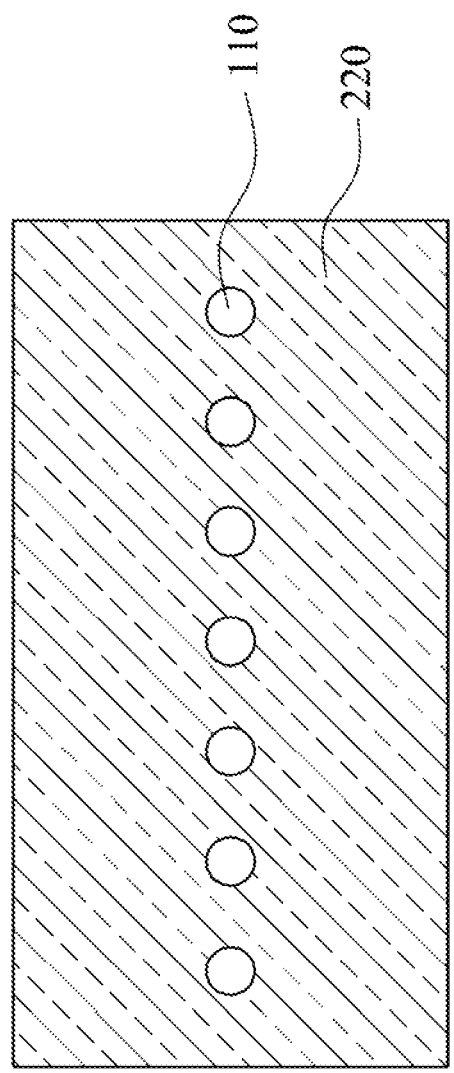
FIG. 4 is a schematic cross-sectional view illustrating a thermoplastic epoxy matrix composite according to further another embodiment of the present disclosure.

FIG. 4 is a schematic cross-sectional view illustrating a thermoplastic epoxy matrix composite 200 according to further another embodiment of the present disclosure. The thermoplastic epoxy matrix composite 200 includes a plurality of fibers 110 and a thermoplastic epoxy matrix 220 combined with the fibers 110. The thermoplastic epoxy matrix 220 is prepared from the aforementioned thermoplastic epoxy matrix formulation by undergoing a polymerization reaction. Specifically, the thermoplastic epoxy matrix composite 200 can be prepared from the thermoplastic epoxy matrix prepreg 100 in FIG. 1. The thermoplastic epoxy matrix prepreg 100 is heated to an elevated temperature, such as 160° C. to 180° C., so that the polymerization reaction of the difunctional epoxy resin and the latent hardener occurs, and the resin film 120 of the thermoplastic epoxy matrix prepreg 100 is transformed into the thermoplastic epoxy matrix 220. Thus, the thermoplastic epoxy matrix composite 200 is obtained.

The molecular weight (Mw) of the thermoplastic epoxy matrix 220 can be about 16000 to 50000, so that the thermoplastic epoxy matrix 220 can provide good toughness, temperature resistance, and the physical properties of the thermoplastic epoxy matrix composite 200 can be improved thereby.

With the application of the thermoplastic epoxy matrix formulation, the thermoplastic epoxy matrix composite 200 is thermoplastic, and can be reshaped after cured. It is favorable for recycling the thermoplastic epoxy matrix composite 200. It is also favorable for the subsequent processes and maintenance of the thermoplastic epoxy matrix composite 200, and is environment friendly.

EXAMPLES

The 1st example is prepared as follows. A difunctional epoxy resin BE-501 (purchased from ChangChun Plastics. Co. Ltd., EEW=475, 7.5 g), a difunctional epoxy resin BE-188 (purchased from ChangChun Plastics. Co. Ltd., EEW=186, 2.5 g), bisphenol A (0.2 g) are put into a container and stirred at 120° C. for 30 minutes to fully dissolve the bisphenol A in BE-188. 3-nitroaniline (2.07 g), and a Lewis base (trace amount of TBP) are added and mixed with the mixture at 80° C. to obtain a transparent deep orange resin mixture. The viscosity of the resin mixture is about 20000±1000 cps at 30° C. Afterwards, the resin mixture is heated to an elevated temperature of 180° C. for 2 hours so as to undergo a polymerization, and a thermoplastic epoxy matrix with an Mw of 20000±4000 (measured by the gel permeation chromatography (GPC)) is obtained. The Tg of the thermoplastic epoxy matrix is 87±4° C. (measured by the differential scanning calorimetry (DSC)).

The 2nd example is as follows. A difunctional epoxy resin BE-188 (purchased from ChangChun Plastics. Co. Ltd., EEW=186, 10 g) and 2,6-dimethylaniline (3.5 g) are put into a container and mixed at room temperature (about 20° C.) to obtain a transparent light yellow resin mixture. The viscosity of the resin mixture is about 200±50 cps at 25° C. Afterwards, the resin mixture is heated to an elevated temperature of 160° C. for 2 hours so as to undergo a polymerization, and a thermoplastic epoxy matrix with an Mw of 30000±4000 (measured by the GPC) is obtained. The Tg of the thermoplastic epoxy matrix is 98±1° C. (measured by the DSC).

The 1st comparative example is as follows. A difunctional epoxy resin BE-188 (purchased from ChangChun Plastics. Co. Ltd., EEW=186, 10 g) and 3,4-dimethylaniline (3.5 g) are put into a container and mixed at room temperature (about 20° C.) to obtain a transparent brown resin mixture. The viscosity of the resin mixture is about 250±50 cps at 25° C. Afterwards, the resin mixture is heated to an elevated temperature of 160° C. for 1 hour so as to undergo a polymerization, and a thermoplastic epoxy matrix with an Mw of 40000±5000 (measured by the GPC) is obtained. The Tg of the thermoplastic epoxy matrix is 97±2° C. (measured by the DSC).

The shelf life of the resin mixture of the 1st example, the 2nd example and the 1st comparative example are measured. The results are listed in Table 1.

TABLE 1

| | 1st example | 2nd example | 1st comparative example |
|---|---|---|---|
| shelf life (at 25° C.) | >10 days | >3 days | about 5 hr |

Figure 7:
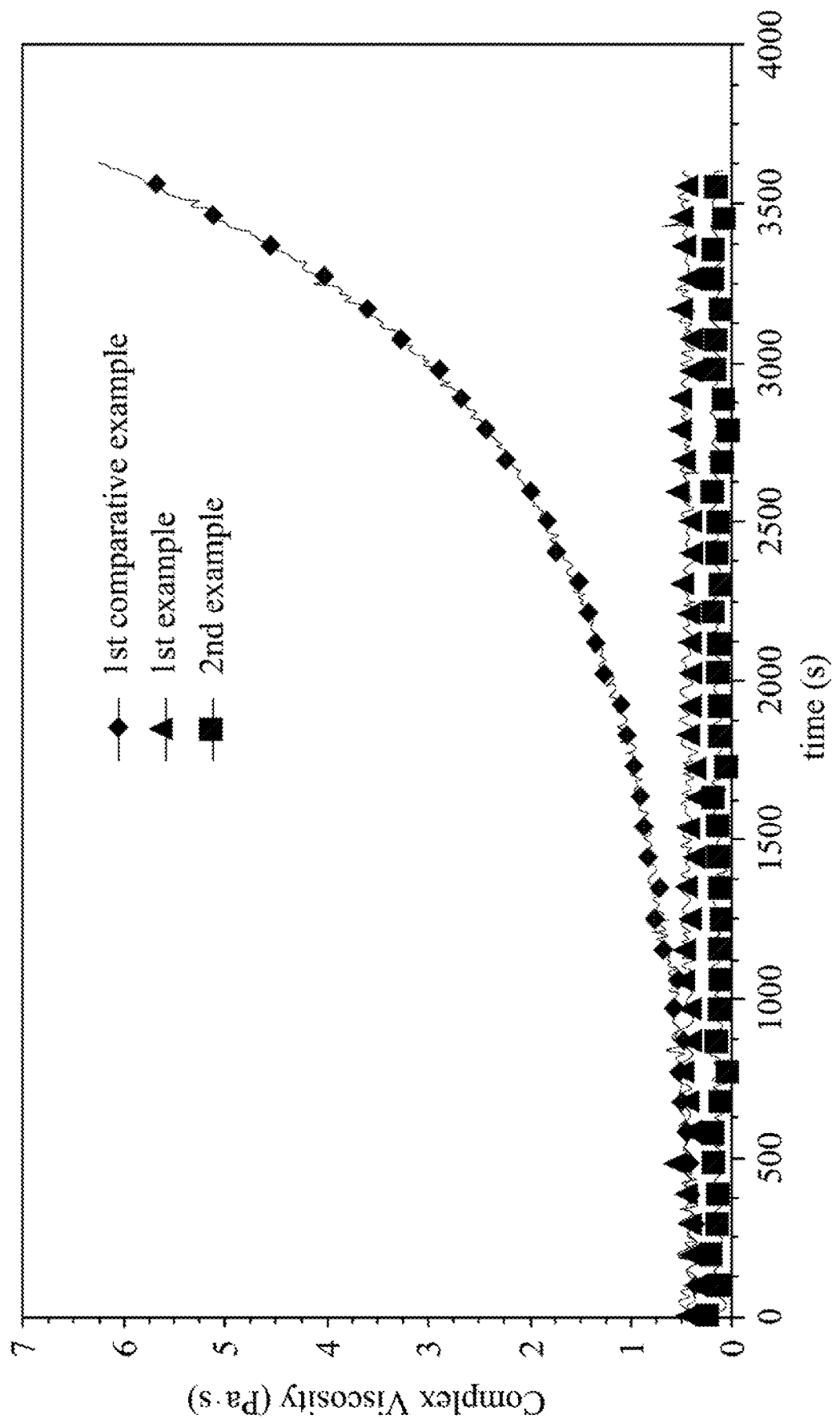
FIG. 7 shows the relationship of a complex viscosity and a time of the 1st example, the 2nd example and the 1st comparative example.

The viscosity of the resin mixture of the 1st example, the 2nd example and the 1st comparative example at 70° C. are further observed. FIG. 7 shows the relationship of the complex viscosity and the time of the 1st example, the 2nd example and the 1st comparative example. As shown in FIG. 7, the complex viscosity of the 1st example, the 2nd example can be maintained and are not changed significantly. However, the complex viscosity of the 1st comparative example increased significantly, which is not favorable to the preparation of the thermoplastic epoxy matrix prepreg.

Accordingly to the present disclosure, the term "thermoplastic epoxy matrix" refer to an epoxy matrix can be reshaped at an elevated temperature after cured.

Accordingly to the present disclosure, the term "cure" refers to the polymerization reaction of the difunctional epoxy resin and the latent hardener.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A thermoplastic epoxy matrix formulation, based on 100 parts by weight of the thermoplastic epoxy matrix formulation, comprising:
   0.1 to 95 parts by weight of a difunctional epoxy resin; and
   0.1 to 80 parts by weight of a latent hardener, wherein the latent hardener is an amine compound containing two reactive hydrogens, and the latent hardener is 2, 6-dimethylaniline.

2. The thermoplastic epoxy matrix formulation of claim 1, wherein an epoxy equivalent weight (E.E.W.) of the difunctional epoxy resin is 150 g/mol to 1000 g/mol.

3. The thermoplastic epoxy matrix formulation of claim 1, further comprising a catalyst, wherein the catalyst causes no self-polymerization of the difunctional epoxy resin.

4. The thermoplastic epoxy matrix formulation of claim 3, wherein the catalyst comprises a phenol group-containing compound.

5. The thermoplastic epoxy matrix formulation of claim 3, wherein the thermoplastic epoxy matrix formulation comprises 0.01 to 5 parts by weight of the catalyst.

6. The thermoplastic epoxy matrix formulation of claim 1, further comprising an additive.

7. The thermoplastic epoxy matrix formulation of claim 6, wherein the additive comprises a crosslinking agent, a UV-blocking agent, a plasticizer, a flexibilizer, an internal mold releasing agent or a filler.

8. The thermoplastic epoxy matrix formulation of claim 6, wherein the thermoplastic epoxy matrix formulation comprises 0.01 to 20 parts by weight of the additive.

9. A thermoplastic epoxy matrix prepreg, comprising:
   a plurality of fibers; and
   a resin film combined with the fibers, wherein the resin film is prepared by the thermoplastic epoxy matrix formulation of claim 1.

10. The thermoplastic epoxy matrix prepreg of claim 9, wherein an E.E.W. of the difunctional epoxy resin is 150 g/mol to 1000 g/mol.

11. The thermoplastic epoxy matrix prepreg of claim 9, wherein the fibers are formed into a fabric.

12. A thermoplastic epoxy matrix composite, comprising:
   a plurality of fibers; and
   a thermoplastic epoxy matrix combined with the fibers, wherein the thermoplastic epoxy matrix is prepared from the thermoplastic epoxy matrix formulation of claim 1 by undergoing a polymerization reaction.

13. The thermoplastic epoxy matrix composite of claim 12, wherein an E.E.W. of the difunctional epoxy resin is 150 g/mol to 1000 g/mol.

14. A method for manufacturing a thermoplastic epoxy matrix prepreg, comprising:
   providing a plurality of fibers; and
   providing a combining step, wherein a resin film is combined with the fibers, the resin film is prepared by a thermoplastic epoxy matrix formulation, the thermoplastic epoxy matrix formulation comprises 0.1 to 95 parts by weight of a difunctional epoxy resin and 0.1 to 80 parts by weight of a latent hardener based on 100 parts by weight of the thermoplastic epoxy matrix formulation, the latent hardener is an amine compound containing two reactive hydrogens, and the latent hardener is 2, 6-dimethylaniline.

15. The method of claim 14, wherein an E.E.W. of the difunctional epoxy resin is 150 g/mol to 1000 g/mol.

16. The method of claim 14, wherein the resin film is combined with the fibers by hot-melt method.

17. The method of claim 16, wherein the combining step comprising:
   providing a mixing step, wherein the difunctional epoxy resin and the latent hardener are mixed to form a resin mixture; and
   providing an impregnating step, wherein the resin mixture is contacted with fibers, and the resin film combined with the fibers is formed.

18. The method of claim 17, wherein the mixing step is conducted at a temperature of 20° C. to 80° C., and the impregnating step is conducted at a temperature of 90° C. to 120° C.

* * * * *